March 31, 1925.
C. JABLOW
1,531,655
LOCOMOTIVE TRUCK
Filed Sept. 16, 1922
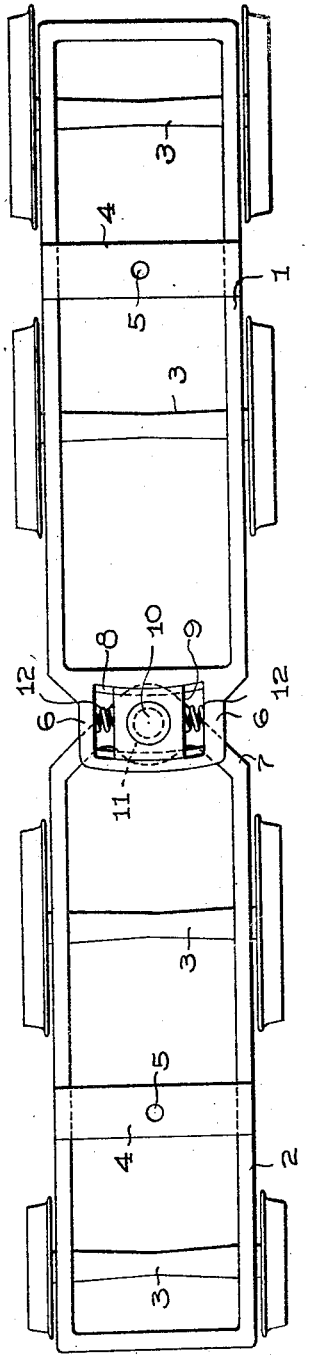
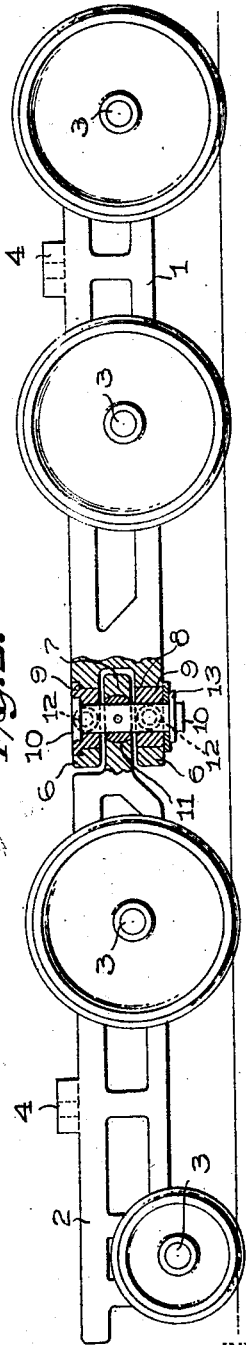
WITNESSES:
INVENTOR
Charles Jablow
BY
ATTORNEY Patented Mar. 31, 1925.

1,531,655

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE TRUCK.

Application filed September 18, 1922. Serial No. 588,552.

*To all whom it may concern:*

Be it known that I, CHARLES JABLOW, a citizen of the United States, and a resident of East Pittsburgh, in the county of Allegheny and State of Pennsylvania, have invented a new and useful Improvement in Locomotive Trucks, of which the following is a specification.

My invention relates to railway vehicle trucks, more especially to hinge constructions therefor which will permit freedom of articulation between the respective trucks constituting the body support.

It is among the objects of this invention to provide a yielding and flexible connection between articulated trucks of locomotives to prevent excessive stressing and nosing of the members and to assist in guiding on curves.

It is a further object to provide a structure which shall be simple in design mechanically strong and efficient in its operation.

Various types of connections between trucks have been proposed to provide entire freedom of articulation and, though it is among the objects of my present invention to produce a flexible yielding connection, my structure is so designed as to limit such relative movement in certain directions and to prevent it entirely in others.

In the accompanying drawing, constituting a part hereof and in which like reference characters indicate like parts, Fig. 1 is a plan view of a pair of articulated railway trucks provided with a yieldable connection embodying the principles of my invention, and Fig. 2 is a side elevational view thereof.

Referring to Fig. 2, the truck structure comprises a plurality of truck frames 1 and 2 journaled to a plurality of wheeled axles 3 and provided with center-bearing plates 4 upon which a locomotive body (not shown) is pivotally mounted with suitable center pins disposed in the openings 5 thereof.

The trucks 1 and 2 are connected by a hinge comprising a plurality of co-operatively extended overlapping end sills 6 and 7 of the trucks 1 and 2, respectively. The end sills 6 are provided with transversely elongated openings or guides 8 adapted to receive correspondingly shaped but somewhat shorter cross-heads 9 which are pivotally mounted on a center pin 10 movably secured in a ball seat 11 provided in the extended end sill 7 of the truck 2. The cross-head is limited in its transverse or lateral movement by a plurality of yielding supports, such as coil springs 12, and the center pin 10 is provided with a stop 13 to limit the relative vertical movement of the center pin. The guide 8 and the cross-head 9 may be curved as shown but the curvature may be inclined in the opposite direction or eliminated entirely.

The operation of the hinge connection is obvious from the illustration which indicates that pivotal movement is permissible about the center pin 10. The cross-head 9 is adapted to move laterally in the guide 8 and vertical movement is permitted by the ball joint 11, but relative longitudinal movement is entirely eliminated as the cross-head 9, center pin 10 and the transverse sides of the guide 8 rigidly maintain their longitudinal positions.

My construction reduces, to a large extent, the thrust and resultant flange wear on the wheels when the trucks run from a tangent to a curve, owing to the center of movement of the leading truck being the point of connection between the two trucks.

It will be readily seen from the above description of my invention that locomotive truck frames constructed and connected in accordance therewith permit of using a longer wheelbase without encountering the difficulties common to the long-wheelbase construction.

The yieldable supporting structure, comprising the helical coil springs disposed between the cross-head and guide, will restrain the lateral movement to a predetermined degree governed by the capacity of the springs but will permit of such lateral movement when this predetermined load is exceeded.

Although I have described a specific embodiment of my invention, it will be obvious to those skilled in the art that various modifications may be made in the details of construction as, for instance, the cross-head 9 may be mounted in a guide provided in the projection 7 of the truck frame 2 and the pin 10 secured in the frame 1, or a single cross-head may be employed in one of the end sills 6. The spring members 12 may be omitted or leaf springs may be substituted for the coil springs and the general arrangement of parts may be modified to attain any desired amount of lateral and pivotal movements. These and other changes may be made without departing from the principles herein set forth.

I claim as my invention:

1. A railway vehicle comprising a plurality of wheeled truck frames and means for yieldingly restraining relative transverse movement between the adjacent ends of said frames, said means comprising projecting overlapping end frames on said trucks one of which is provided with a transversely elongated opening and a movable guide block in said opening for a center pin support for the other of said truck frames.

2. A railway vehicle comprising a plurality of wheeled truck frames and means for yieldingly restraining relative transverse movement between the adjacent ends of said frames, said means comprising projecting overlapping end frames on said trucks provided with a transversely elongated opening and a center-pin guide block adapted to move laterally in said opening having a flexible element disposed on each end.

3. A railway vehicle comprising a plurality of wheeled truck frames and means for yieldingly restraining relative transverse movement between the adjacent ends of said frames, said means comprising a projecting overlapping end frame on each of said trucks one of which is provided with a plurality of transversely elongated openings adapted to receive a laterally movable guide block having a helical spring disposed on each end intermediate said frame and a center pin engaging said block and the extending end of the other of said trucks.

4. A railway vehicle comprising a plurality of wheeled truck frames, means for yieldingly restraining relative transverse movement between the adjacent ends of said frames, and means for rigidly holding said frames against relative longitudinal movement said last named means comprising a laterally movable guide block having a center pin connection with one of said trucks.

5. A railway vehicle comprising a plurality of wheeled truck frames, means for yieldingly restraining relative transverse movement between the adjacent ends of said frames, and means for rigidly holding said frames against relative longitudinal movement, said means comprising projecting overlapping end frames on said trucks one of which is provided with a plurality of transversely elongated arcuate openings and a correspondingly shaped laterally movable center-pin support.

6. A railway vehicle comprising a plurality of wheeled truck frames, means for limiting relative vertical movement between said frames, means for yieldingly restraining relative transverse movement between the adjacent ends of said frames and means for rigidly holding said frames against relative longitudinal movement, said means consisting of a hinge structure comprising a plurality of movable heads disposed in guides provided in the extended end of one of said frames, said heads being provided with a center pin extending therethrough and coacting with the adjacent truck frame.

7. A railway vehicle comprising a plurality of wheeled truck frames, means for providing relative vertical movement between said frames, means for yieldingly restraining relative transverse movement between the adjacent ends of said frames and means for rigidly holding said frames against relative longitudinal movement, said means consisting of a hinge structure comprising a plurality of movable heads disposed in guides provided in the extended end sills of one of said frames having a center pin extending vertically therethrough and secured to a ball joint in the co-operating truck sill.

In testimony whereof, I have hereunto subscribed my name this 12th day of September, 1922.

CHARLES JABLOW.